United States Patent [19]

Van Den Berghe et al.

[11] 4,130,693
[45] Dec. 19, 1978

[54] ELECTROLYTE-CATHODE ASSEMBLY FOR A FUEL CELL

[76] Inventors: Paul Van Den Berghe, 43, Cours Sablon, 63000 Clermont Ferrand, France; Helmut Tannenberger, La Villette 218, 1451 Le Chateau de Ste Croix, Switzerland

[21] Appl. No.: 801,392

[22] Filed: May 27, 1977

[30] Foreign Application Priority Data

May 28, 1976 [CH] Switzerland .................... 6737/76

[51] Int. Cl.² ............................................. H01M 4/86
[52] U.S. Cl. .................................................. 429/41
[58] Field of Search ............................ 429/40, 41, 44; 252/62.2, 461, 463

[56] References Cited

U.S. PATENT DOCUMENTS

| 3,558,360 | 1/1971 | Sverdrup et al. ............... 429/40 |
| 3,834,943 | 9/1974 | Van Der Berghe ............. 429/41 |

*Primary Examiner*—Anthony Skapars
*Attorney, Agent, or Firm*—Haseltine, Lake & Waters

[57] ABSTRACT

An electrolyte cathode assembly for a solid electrolyte fuel cell suitable for operation at high temperatures comprises a gas-tight body made of a solid ceramic electrolyte which is capable of conducting oxygen ions having in contact with it and secured to it a layer of electron-conducting material which is a mixture of doped indium oxide $In_2O_3$ and a ceramic material which is capable of conducting oxygen ions at the cell operating temperature, the said layer being covered by a compact surface layer of a ceramic material which is capable of conducting both electrons and oxygen ions.

6 Claims, 1 Drawing Figure

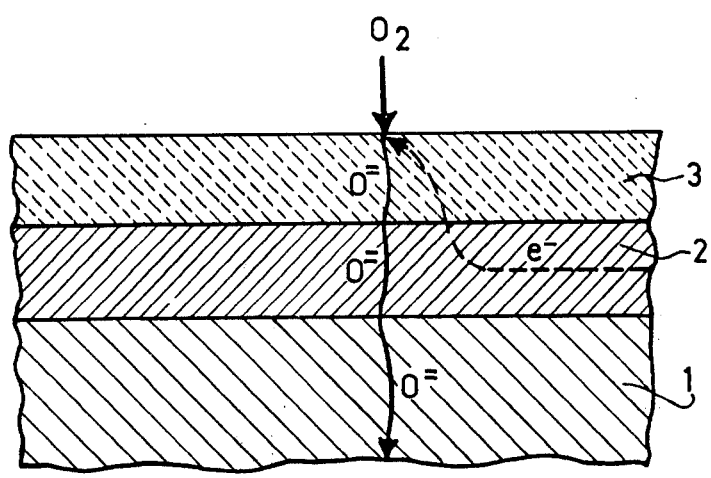

ELECTROLYTE-CATHODE ASSEMBLY FOR A FUEL CELL

BACKGROUND OF THE INVENTION

This invention relates to an electrolyte-cathode assembly for a solid electrolyte fuel cell suitable for operation at high temperatures, of the type comprising a gas-tight body made of solid ceramic electrolyte capable of conducting oxygen ions and at least one layer of electronconducting material in contact with the electrolyte and secured thereto.

It is known that in a certain kind of solid-electrolyte fuel cell operating at a temperature generally of the order of 600° to 1000° C., the electrolyte is an oxide having cavities in its structure, for example stabilized zirconium dioxide, having a relatively high oxygen-ion conductivity in the aforementioned range of operating temperatures.

In a fuel cell of this kind, the cathode usually comprises a layer of a metal, for example silver, which is a good conductor of electricity and which does not oxidize under the cell operating conditions, the metal layer being in contact with the electrolyte and secured thereto.

Known metal cathodes are not completely satisfactory since they have the disadvantage of becoming detached, at least partly, from the electrolyte surface after a varying period of use, thus reducing their active surface. In addition, metal cathodes may be subject to recrystallization, which modifies their porous structure and adversely influences their electrochemical properties and their lateral electric conductivity.

A considerable research effort has been made in order to find and develop cathodes having low polarization combined with a long life.

Swiss patent specification No. 478 463 describes an electrode which can be used either as the cathode or as the anode of a solid electrolyte fuel cell operating at high temperature. The electrode comprises a first porous layer made of granules of a ceramic material conducting oxygen ions and electrons, the first layer being in contact with the electrolyte and secured thereto, and a second porous layer covering the first layer and comprising a material having a high electron conductivity, for example a metal or a ceramic material.

Swiss patent specification No. 540 571 describes an electrolyte-electrode assembly comprising a sealed-tight body made of a solid electrolyte which conducts oxygen ions at high temperature and an electrode made up of at least one layer of doped indium oxide and covering part of the surface of the electrolyte and adhering thereto, the layer of doped indium oxide being made up dendrites the major axes of which are perpendicular to the electrolyte surface.

An object of the present invention as exemplified hereafter is to provide an electrolyte-cathode assembly in which the cathode has polarization characteristics at least as good as those of the electrodes described in the aforementioned Swiss Patent Specifications, but which also has an even better service life than the aformentioned electrodes.

SUMMARY OF THE INVENTION

According to the present invention there is provided an electrolyte-cathode assembly for a solid electrolyte fuel cell suitable for operation at high temperatures, which assembly comprises a gas-tight body made of a solid ceramic electrolyte which electrolyte is capable of conducting oxygen ions, and at least one layer of an electron-conducting material in contact with the electrolyte and secured thereto, wherein said layer of an electron-conducting material is a compact layer of a mixture of doped indium oxide $In_2O_3$ and a ceramic material which is capable of conducting oxygen ions at cell operating temperature, said layer being covered by a compact surface layer of ceramic material which is capable of conducting electrons and oxygen ions.

The ceramic material which is capable of conducting oxygen ions in the layer in contact with the electrolyte can have the same composition as the solid electrolyte or can have a composition of the same kind. For example, the material can be a mixed oxide comprising a solid solution in the crystallized state in the cubic system, based on zirconium oxide $ZrO_2$, containing at least one oxide stabilizing the cubic phase of zirconium oxide. The stabilizing oxide can be chosen inter alia from oxides of the following elements: Ca, Mg, Y, Sc and the rare earths. More particularly, mixtures of rare-earth oxides can be used.

The ceramic material capable of conducting oxygen ions can, for example, be a mixed oxide comprising a solid solution crystallized in the cubic system and containing 90 mol % of zirconium oxide $ZrO_2$ and 10 mol % of yttrium oxide $Y_2O_3$.

Alternatively the ceramic material conducting oxygen ions in the layer in contact with the electrolyte can be a material which also conducts electrons to some extent.

The aforementioned material which is capable of conducting electrons and oxygen ions can, for example, be a mixed oxide comprising a solid solution, crystallized in the cubic system, based on zirconium oxide $ZrO_2$ and containing at least one oxide stabilizing the cubic phase of zirconium oxide and uranium oxide $UO_2$.

More particularly, the mixed oxide can be a solid solution, crystallized in the cubic system, containing at least 78 mol % and at most 86 mol % zirconium oxide; at least 8 mol % and at most 12 mol % yttrium oxide $Y_2O_3$ and at least 4 mol % and most 12 mol % uranium oxide.

The doping element in the doped indium oxide can be at least one of the elements which it is known to use for this purpose, inter alia one of the following elements: antimony, tellurium, gallium, zinc, tin, cadmium, germanium, tantalum, titanium, tungsten, chlorine and fluorine.

Preferably the doping element is tin, the proportion of tin being preferably between 1 and 5% of the atoms with respect to the total number of indium and tin atoms.

Preferably the proportion of doped indium oxide in the mixture is at least 20% by volume and at most 80% by volume, the ceramic material which is capable of conducting oxygen ions making up the remainder.

BRIEF DESCRIPTION OF THE DRAWING

An embodiment of the electrolyte-cathode assembly according to the invention is shown diagrammatically, by way of example, in the accompanying drawing.

The single FIGURE in the drawing is a magnified diagrammatic section, not to scale, of part of the cathode and of the portion of the electrolyte adjacent the cathode.

DESCRIPTION OF THE PREFERRED EMBODIMENTS

The assembly shown in the drawing comprises a compact layer 2 of a mixture of doped indium oxide and ceramic material which is capable of conducting oxygen ions at the cell operating temperature, which is pressed on to a sealed-tight electrolyte body 1 and is secured thereto.

The electrolyte-cathode assembly shown in the drawing also comprises a surface layer 3 of a ceramic material which is capable of conducting electrons and oxygen ions at the cell operating temperature, covering the surface of layer 2 and secured thereto.

The material of the surface layer may advantageously be a mixed oxide comprising a solid solution, in the crystallized state in the cubic system, based on zirconium oxide and containing at least one oxide stabilizing the cubic phase of zirconium oxide, and uranium oxide $UO_2$. More particularly, the solid solution can contain at least 78 mol % and at most 86 mol % of zirconium oxide; at least 8 mol % and at most 12 mol % ytterbium oxide $Yb_2O_3$ and at least 4 mol % and at most 12 mol % of uranium oxide.

The thickness of the surface layer 3 is preferably at least one micron and at most 10 microns, and the thickness of layer 2 is preferably at least 30 microns and at most 200 microns.

The operation of the electrolyte-cathode assembly in the embodiment shown in the drawing, in the case where the fuel for operating the cell is oxygen or a gaseous mixture containing oxygen, for example air, is diagrammatically indicated by lines ending in arrows, showing the direction of flow of molecular oxygen, electrons and oxygen ions (denoted by the conventional symbols $O_2$, $e^-$ and $O^=$ respectively).

Oxygen coming into contact with the surface of layer 3 is ionized by a supply of transferred electrons, by lateral conduction through layer 2, and subsequently by transverse conduction through layer 3 coming from the positive terminal of the cell (not shown in the drawing).

Ionization occurs in accordance with the following chemical equation (cathode reaction):

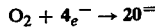

$$O_2 + 4e^- \rightarrow 2O^=$$

The resulting oxygen ions migrate through layer 3, layer 2 and the electrolyte in succession, towards the cell anode (not shown), where they take part in the well-known anodic reaction in the presence of the fuel.

The electrolyte-cathode assembly hereinbefore described has a structure which is particularly advantageous for obtaining a long service life. The nature of layer 2, which is made of the same material as the electrolyte or of a material very similar to that of the electrolyte, and which also comprises another ceramic material (doped indium oxide) ensures excellent contact between layer 2 and the electrolyte, the contact being substantially free from progressive deterioration, even if the cell is subjected to a very large number of heating and cooling cycles.

In addition, since layer 2 is made of ceramic material only, the crystallization phenomena previously mentioned in connection with metal cathodes are avoided in the case of the electrolyte-cathode assembly according to this invention as herein exemplified.

The shape of the cathode depends of course on that of the solid electrolyte body, which can have any known shape, for example a disc, tube or plate.

Similarly the cathode dimensions, for example that of its surface, are adapted to those of the electrolyte body in accordance with the general configuration of the cell and the criteria applied for constructing cells of this kind.

The cathode can be manufactured by any appropriate method. For example, known methods can be used such as spraying powdered materials on to the electrolyte body, using a flame or plasma torch; spraying at ambient temperature of a suspension of powder in a liquid containing a binding agent, followed by sintering the electrolyte-anode assembly so as to harden it or simultaneously harden the electrolyte and cathode; deposition by chemical reaction in the vapour phase (C.V.D.) or evaporation and condensation in vacuo. Preferably the last-mentioned method is followed, using a vacuum chamber provided with an evaporation and condensation device comprising an electron gun having a movable beam, the device being suitable for simultaneously and adjustably evaporating two different materials.

The aforementioned feature of the evaporation and condensation device can be used for forming the layer 2 of the electrolyte-cathode assembly by simultaneously evaporating doped indium oxide and a ceramic material which is capable of conducting oxygen ions, mixing in the vapor phase and continuous condensation of a layer of a mixture on to the surface of the solid electrolyte body.

EXAMPLE 1

An electrolyte-cathode assembly having the shape of a disc, 2 cm² in area, comprising a compact layer 2, 100 microns thick, is made of a homogeneous mixture having the following composition in percentage by volume:

Tin-doped indium oxide (composition corresponding to 4 mol % tin oxide $SnO_2$ and 96 mol % indium oxide $In_2O_3$): 77.6%.

Solid solution containing 82 mol % zirconium oxide $ZrO_2$, 10 mol % yttrium oxide $Y_2O_3$ and 8 mol % uranium oxide $UO_2$: 22.4%.

Layer 2 is obtained by simultaneous deposition of doped indium oxide and the aforementioned solid solution, in proportions corresponding to the aforementioned percentages, on to the surface of a solid electrolyte disc (area: 2 cm²; thickness 0.1 mm; composition: 90 mol % zirconium oxide $ZrO_2$; 10 mol % yttrium oxide $Y_2O_3$), using the method of evaporation and condensation in vacuo.

The assembly also comprises a compact mixed-oxide layer 3 having a thickness of 2 microns and comprising a solid solution containing 82 mol % zirconium oxide, 10 mol % ytterbium oxide $Yb_2O_3$ and 8 mol % uranium oxide $UO_2$.

Layer 3 is formed by deposition on to the surface of layer 2, using the method of evaporation and condensation in vacuo, under the same conditions as for depositing layer 2, in a vacuum chamber also containing the electrolyte body after it has been coated with layer 2.

In practice, the same evaporation and condensation device is used for successively depositing layers 2 and 3 on to the surface of electrolyte body 1.

EXAMPLE 2

An electrolyte-cathode assembly is made corresponding to that described in Example 1, except that the layer 2 is a mixture having the following composition (in percentage volumes):

Indium oxide doped with tin (96 mol % indium oxide $In_2O_3$ and 4 mol % tin oxide $SnO_2$): 75%

Solid solution containing 90 mol % zirconium oxide $ZrO_2$ and 10 mol % yttrium oxide $Y_2O_3$: 25%

This assembly is constructed in a similar manner to that of the assembly described in Example 1.

We claim:

1. An electrolyte-cathode assembly for a solid electrolyte fuel cell suitable for operation at high temperatures, which assembly comprises a gas-tight body made of a solid ceramic electrolyte capable of conducting oxygen ions, and at least one layer of an electron-conducting material in contact with the electrolyte and deposited thereon, wherein said layer of electron-conducting material is a compact layer having a thickness of at least 1 micron and at most 200 microns and made of a mixture containing from 20 to 80% by volume of indium oxide $In_2O_3$ doped with tin oxide, the remainder being a ceramic material capable of conducting oxygen ions at the cell operating temperature and which is a mixed oxide solid solution, crystallized in the cubic system, consisting essentially of zirconium oxide $ZrO_2$ and at least one oxide stabilizing the cubic phase of zirconium oxide, said layer being covered by a compact surface layer having a thickness of at least 1 micron and at most 10 microns of ceramic material capable of conducting electrons and oxygen ions and which is a mixed oxide solid solution crystallized in the cubic system, consisting essentially of (1) zirconium oxide $ZrO_2$, (2) at least one oxide stabilizing the cubic phase of zirconium oxide and (3) uranium oxide $UO_2$.

2. An electrolyte-cathode assembly as claimed in claim 1 wherein the solid electrolyte has the same composition as the ceramic material which is capable of conducting oxygen ions.

3. An electrolyte-cathode assembly as claimed in claim 1 wherein the ceramic material which is capable of conducting oxygen ions is also capable of conducting electrons.

4. An electrolyte-cathode assembly as claimed in claim 3 wherein the ceramic material is a mixed oxide, in the crystallized state in the cubic system, based on zirconium oxide $ZrO_2$ and containing at least one oxide stabilizing the cubic phase of zirconium oxide and uranium oxide $UO_2$.

5. An electrolyte-cathode assembly as claimed in claim 4 wherein the mixed oxide contains at least 78 mol % and at most 86 mol % of zirconium oxide; at least 8 mole % and at most 12 mol % of ytterbium oxide $Yb_2O_3$ and at least 4 mol % and at most 12 mol % of uranium oxide.

6. An electrolyte-cathode assembly as claimed in claim 1 wherein the solid solution contains at least 78 mol % and at most 86 mol % of zirconium oxide; at least 8 mol % and at most 12 mol % of ytterbium oxide $Yb_2O_3$ and at least 4 mol % and at most 12 mol % of uranium oxide.

* * * * *